United States Patent

[11] 3,547,026

[72] Inventor Norbert J. Stevens
San Marino, Calif.
[21] Appl. No. 756,634
[22] Filed Aug. 30, 1968
[45] Patented Dec. 15, 1970
[73] Assignee BSP Corporation
San Francisco, Calif.
a corporation of California

[54] STERILIZATION SYSTEM
3 Claims, 5 Drawing Figs.

[52] U.S. Cl. .................................................. 99/251,
99/216; 165/86; 87
[51] Int. Cl. ........................................................ B65b
55/14, B65b 55/18
[50] Field of Search ............................................ 99/216,
251; 165/86, 87

[56] References Cited
UNITED STATES PATENTS

| | | | |
|---|---|---|---|
| 337,560 | 3/1886 | Cook | 165/87 |
| 2,020,309 | 11/1935 | Grindrod | 99/216 |
| 2,401,077 | 5/1946 | Johnston | 99/216X |
| 2,492,635 | 12/1949 | Hawk | 99/216 |
| 2,870,028 | 1/1959 | Anderson et al. | 99/216 |
| 2,909,985 | 10/1959 | Abrams | 99/251 |
| 3,391,733 | 7/1968 | Stevens | 165/86 |
| 3,426,838 | 2/1969 | Onarheim | 165/87 |
| 3,429,710 | 2/1969 | Gnaedinger | 99/216X |
| 126,511 | 5/1872 | Beach | 99/251X |
| 510,954 | 12/1893 | Beall | 99/251X |
| 2,091,606 | 8/1937 | Murray | 99/216X |
| 3,139,812 | 7/1964 | Smith et al. | 99/251 |
| 3,156,176 | 11/1964 | Wakeman et al. | 99/251 |

FOREIGN PATENTS

| | | | |
|---|---|---|---|
| 569,215 | 11/1957 | Italy | 99/251 |

OTHER REFERENCES
Christiansen. German Printed App. No. 1,132.788, 7-62. 99-251.

*Primary Examiner*—Tim R. Miles
*Attorney*—Flehr, Hohbach, Test, Albritton and Herbert

ABSTRACT: Protein matter is sterilized with respect to heat sensitive serotype bacteria, principally such as salmonella and coliforms, by passing the protein matter through a sealed unit including a hydration tower and a sterilizer operating at a slight positive pressure. The material is subjected to sterilizing temperatures and then passed into a cooling system whereby moisture is vented to the atmosphere.

INVENTOR.
Norbert J. Stevens

INVENTOR.
Norbert J. Stevens 3,547,026

STERILIZATION SYSTEM

BACKGROUND OF THE INVENTION

In the past it has been recognized that protein material such as meat, bone, or fish meal are easily contaminated with serotype bacteria including salmonella and coliforms. While it has been recognized that such bacteria is heat sensitive and susceptible to sterilization by administration of relatively high temperatures it has also been recognized that the administration of temperatures over about 260° F. destroys the food value of the product. While the bacteria may be destroyed at temperatures of about 209° F. it has been substantially impossible in the past to uniformly treat the product to be sterilized at the temperature of 209° F. Because of the temperature gradient from the interior of individual particles of the matter to the exterior thereof it has been required to overheat the exterior so as to assure that the sterilizing temperature of 209° F. is reached at all portions of the product. Consequently, it has been necessary when a protein product has been found contaminated with salmonella to destroy the entire product rather than attempt sterilization.

More recently it has been determined that the external temperature required to destroy salmonella or other micro-organisms is inversely proportional to the moisture content of the matter to be sterilized. Research in that direction, however, has produced relatively limited commercial success because of the requirement of relatively high moisture contents, in the neighborhood of 10 percent by weight, in order to produce a sterilizing condition. In order for such a system to operate the moisture content of the feed material must first be determined and then the proper amount of moisture added in order to bring the content up to the necessary 10 percent. Such a requirement not only presents a substantial quality control problem on the feed material but also equipment is necessary to accurately add the necessary amount of moisture.

SUMMARY OF THE INVENTION AND OBJECTS

The invention is incorporated in a system whereby the sterilization and hydration takes place in a closed system operating at a slight positive pressure. Hydration steam may be added to the sterilizer so that the moisture content may be raised slightly and thereby adjusted to permit sterilization without regard to the initial moisture content of the feed. After sterilization the product is cooled whereby the moisture added by the steam hydration is removed and the moisture content of the final sterilized product is approximately the same as that of the initial feed product.

It is a general object of the invention to provide an apparatus for sterilizing protein materials incorporating a hydration tower and a through wall heater-sterilizer.

It is another object of this invention to provide apparatus for sterilizing protein matter with respect to heat sensitive serotype bacteria wherein sterilizing temperature can be applied uniformly throughout the material without exceeding protein destructive temperatures.

DESCRIPTION OF THE PREFERRED EMBODIMENTS

Figure 1:
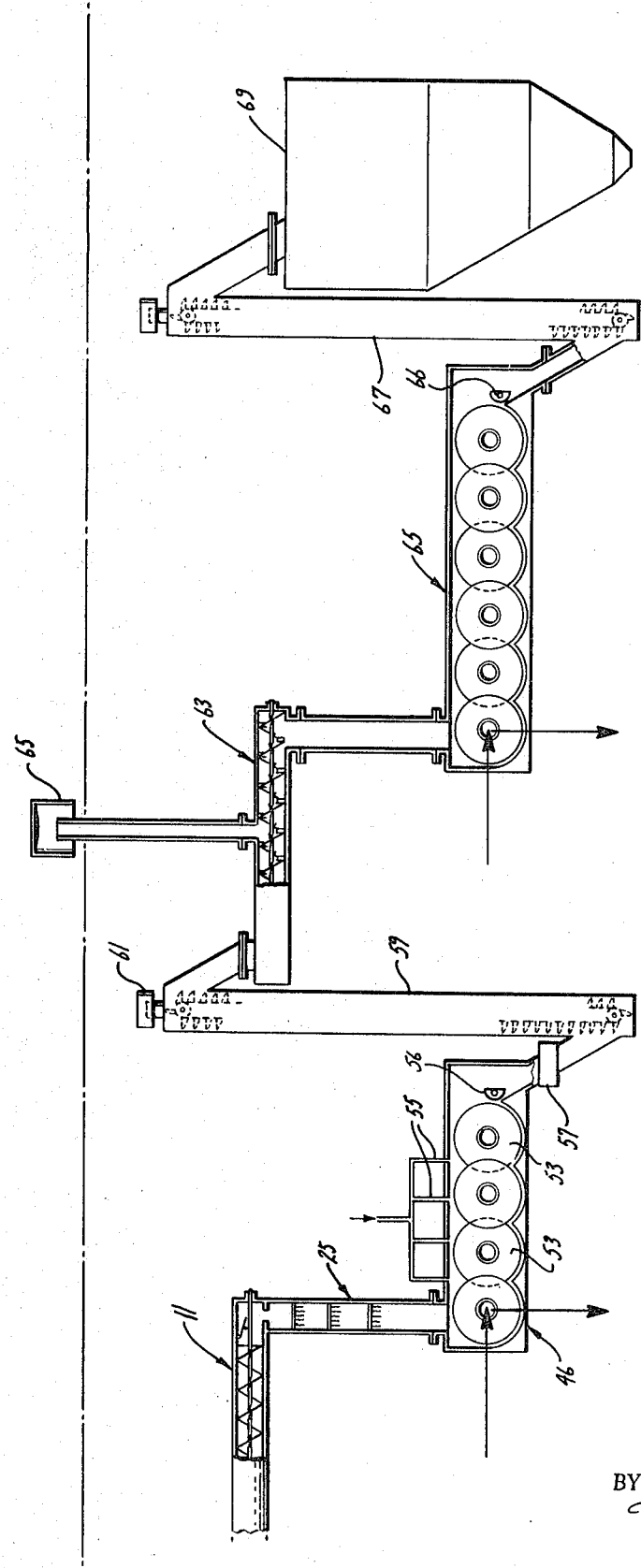
FIG. 1 is a flow sheet showing a sterilization system in accordance with the invention.
Figure 2:
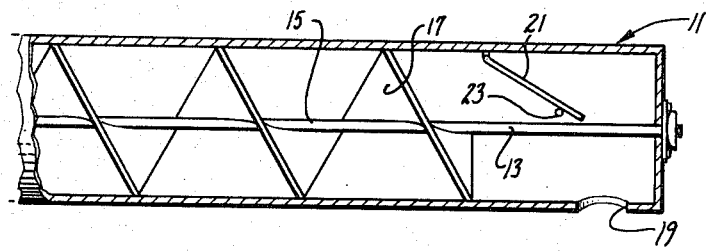
FIG. 2 is a schematic view showing a screw conveyor having a cutback flight and plug seal as used in accordance with the invention.

The system shown in FIG. 1 includes a U-trough screw conveyor 11 which is also partially shown in FIG. 2. The conveyor includes a cutback flight leaving a free space 13 on the shaft 15 between the screw 17 and the discharge 19. A weighted gate 21 is pivotally secured to the top of the conveyor 11 and is held above the shaft 15 by means of a bar 23.

As the screw is rotated, material from a hopper, for instance, is positively fed axially toward the discharge opening 19 by the screw itself but the material located in the area of the clear shaft 13 is pushed toward the opening 19 only by means of the material behind it. The gate 21 serves to compress and compact that fed material about the shaft and below it whereby a material seal is provided just prior to the discharge 19 of the conveyor.

Figure 3:
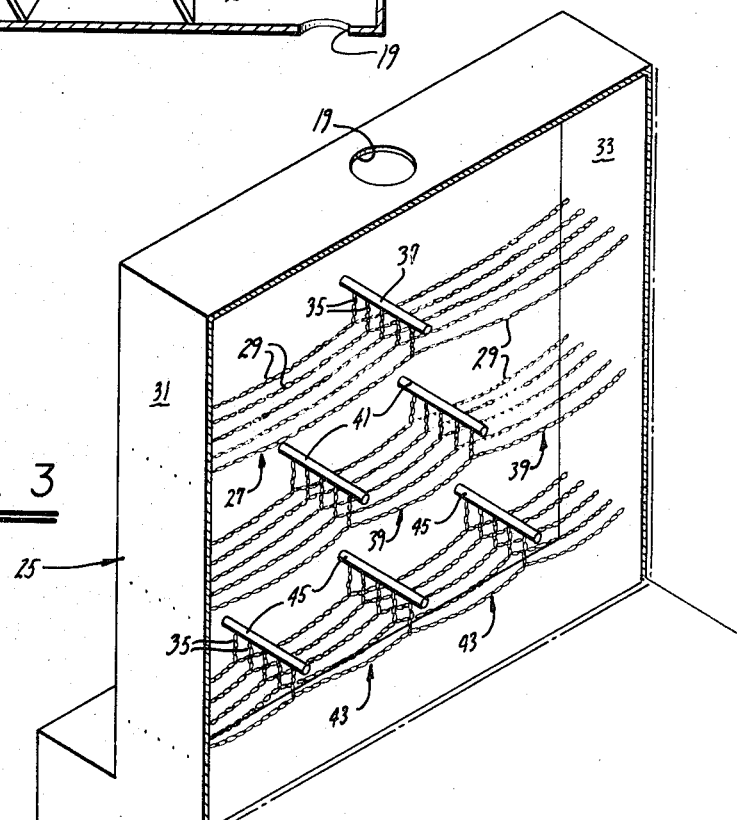
FIG. 3 is a schematic view showing a suspended chain arrangement for dividing the feed material and spreading it uniformly across the input to the sterilizer.

Material from the discharge 19 passes through the hydration tower 25, which is shown more fully in FIG. 3. As seen in FIG. 3 the discharge 19 from the conveyor is in the form of a circular opening in the top of the tower 25. Three tiers of festooned chains are located within the tower 25. Three first or upper tier 27 includes a series of chains 29 having their ends secured to the walls 31 and 33 and their centers secured to depending chains 35, the chains 35 in turn being suspended from a rod 37 which is centrally located with respect to the discharge 19. The second tier 39 is similar to the first except that the chains are festooned upon two rods 41, rather than the single rod 37 as in the first tier. Similarly the third tier 43 is festooned upon three rods 45. As material is dropped into the hydration tower it falls upon the first tier of chains and is spread outwardly to fall primarily upon the apexes of the second tier of chains. Similarly the fall is continued to the apexes of the third tier whereby the material is spread laterally to provide a well distributed flow at the base of the hydration tower spread across the entire width thereof. By use of the dependent chains 35 vibratory motion of the festooned chains is increased whereby relatively little of the material remains on the chains.

Figure 4:
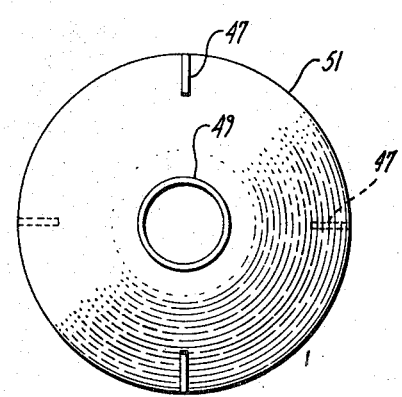
FIG. 4 is a detailed view of a typical disc used in the sterilizer and cooler in accordance with the invention and showing particularly, mixing flights attached thereto.

From the hydration tower the material is passed through the sterilizer proper which comprises a thermal disc processor, as more fully described in my U.S. Pat. No. 3,391,733. In general, the heater is a closed chamber having a series of hollow disc shaped members through which a heat transfer medium, such as steam, is passed and which are rotated on shafts extending transverse to the direction of material movement to mix and agitate the material as well as to move it along the processor itself. The discs themselves differ from the particular embodiments shown in said U.S. Pat. No. 3,391,733 in that they are provided with flights 47, as shown in FIG. 4, arranged on each side of the disc. The flights on one side of the disc are arranged 180° apart and the flights on the opposite side of the disc are located 90° from those on the first side. It has been found that, when processing food product in meal form (90 percent −8 mesh), the length of the flights is critical to provide complete elimination of dead space for the material being processed. The critical length depends upon and may be stated in terms of the distance between the hub 49 to the outer periphery 51. It has been found that by maintaining the flights between 25 percent and 50 percent of the distance between the outer periphery of the disc and the outer periphery of the hub complete agitation and movement of the product is attained.

Another difference from the embodiment shown in said patent is the inclusion of an adjustable weir 56 which controls the residence time of material in the sterilizer. The weir is rotatably and manually adjusted to provide a material residence time in the sterilizer of from 25 seconds to 5 minutes.

In addition to the steam applied to the interior of the discs 53, steam is also applied to the atmosphere within the sterilizer 46 and the hydration tower 25. This may be applied through a series of spray jets 55 on the sterilizer and serves primarily to add moisture to the product being sterilized so as to assure adequate sterilization. The steam thus applied may be at about 7 p.s.i.g. but the pressure may be increased by 2.5 p.s.i.g. for each 10 degree drop in operating temperature. Thus a slight positive pressure is maintained in the sterilizer and hydration tower.

From the sterilizer 46 the product passes through a screw seal, shown schematically at 57, to a covered but vented bucket elevator 59. A portion of the moisture added by the hydration steam is vented to the atmosphere from the elevator vent 61.

Figure 5:
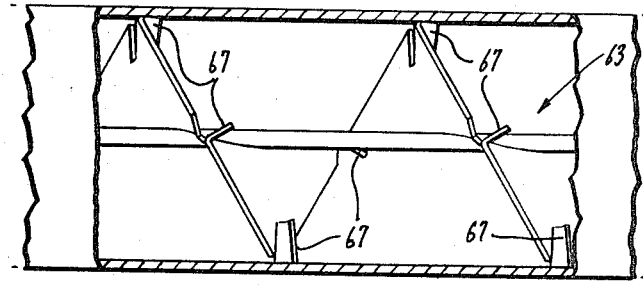
FIG. 5 is a schematic view showing cut and folded flights of a conveyor used in the flash-cooler in accordance with the invention.

The elevator 59 carries the material to a flash cooler conveyor 63 which is in the form of a cut and folded flight screw conveyor. This conveyor is also covered but vented to the atmosphere by means of the vent 65. As shown more particularly in FIG. 5, the flight 67 of the conveyor 63 includes partially cutout portion which are folded outwardly from the screw itself such that a scooping action is attained upon rotation of the screw. Consequently the material passing through the conveyor 63 does not travel as a slug as in the normal screw conveyors but rather is continually tumbled through the conveyor.

From the flash cooler 63 the material is passed to a final cooler 65 which takes the form of the disc processor similar to the sterilizer 46 but in which cooling water is passed through the discs rather than steam. The adjustable weir 66 maintains the level of the product and consequently the residence time. From the final cooler 65 the material is passed to an elevator 67 and finally to a closed storage bin 69.

The method of the invention was used employing the apparatus previously described for a series of tests wherein the sterilizing unit 46 was a Thermal Disc Processor manufactured by BSP Corporation of San Francisco, California. under Model No. 10HV5S43 having a heating area of 19.1 square feet. The unit was modified by adding flights 47. as shown in FIG. 4. Also the adjustable weir 56 was adjusted to provide a residence time of 25 seconds.

The tabulation in Table 1 indicates not only the operating conditions for the various tests but also the bacteria and spore former count of the product sterilized in each test. In tests tests total vegetative bacteria which includes which includes salmonella, was accomplished along with the partial destruction of the spore formers.

In the other operations of the apparatus the process was accomplished using as a sterilizer a larger thermal processor specifically, BSP Model No. 30H4S1211, in the system as shown in FIG. 1. In this process using the larger sterilizer as product is fed through the conveyor 11 at the rate of 26000 pounds per hour and at a temperature of 100° F. and a natural moisture content of from 3 percent to 8 percent. The product passes through the hydration tower to the sterilizer 46 thereby absorbing moisture from the injectors 55. Hydration steam is supplied through the injectors 55 at approximately 400 pounds per hour at 7 p.s.i.g. thus increasing the product moisture by about 1 percent. Operating temperature is maintained at 340° F. by passing steam at 22 pounds per minute and 340° F. to the interior of the discs 53. After passing though the system the steam is returned to the heater as condensate at 335° F.

The output of the sterilizer 46 is at a rate of 26400 pounds per hour and at a temperature of 200° F. which is passed through the elevator 59. In the passage through the elevator 59 approximately 75 pounds of moisture per hour is vented to the atmosphere by vapor flash resulting in 26325 pounds per hour of the product at 195° being fed to the flash conveyor 63. In the flash conveyor 63 approximately 325 pounds per hour of vapor is vented to atmosphere and the output of the flash conveyor 63 to the final cooler 65 is 26000 pounds per hour of the product at 170° F. to 180° F. 71 gallons per minute of cooling water at 60° F. are fed to the interior of the discs in the cooler 65 and exhausted at 80° F. The product output from the cooler 65 is at 26000 pounds per hour and at 115° F., thus indicating an equilibrium in the moisture content of the product. All the moisture added by the hydration jets 55 is vented to the atmosphere either at the elevator vent 61 or the cooler vent 65. Thus the cooling lowers the moisture content by 1 percent and the product is again at its original moisture content of from 3 percent to 8 percent.

I claim:

1. A system for sterilizing protein matter with respect to heat sensitive bacteria such as salmonella and coliforms, comprising conveyor means for carrying said product, hydration means, said hydration means including a steam chamber, means within said steam chamber for subdividing the protein matter into a plurality of streams, sealed means interconnecting said conveyor means and said hydration means for

TABLE I

| 1 | 2 | 3 | 4 | 5 | 6 | 7 | 8 | 9 | 10 | 11 |
|---|---|---|---|---|---|---|---|---|---|---|
| Test No. | Feed rate | Feed temp. | Product Temp., °F. in sterilizer | Disc temp., °F. | Steam injection | Feed bacteria count | Feed spore former count | Final bacteria count | Feed H₂O, percent | Final product H₂O, percent |
| 1 | 170 | 100 | 240 | 324 | Yes | 1,000,000 | 11,000 | 9,000 | 5.7 | 6.1 |
| 2 | 390 | 101 | 244 | 328 | No | 49,000,000 | 580,000 | 220,000 | 6.2 | 3.9 |
| 3 | 365 | 105 | 254 | 328 | No | 16,000,000 | 400,000 | 160,000 | 5.1 | 3.6 |
| 4 | 240 | 104 | 234 | 324 | Yes | 30,000,000 | 250,000 | 31,000 | 6.2 | 8.5 |
| 5 | 325 | 102 | 260 | 290 | No | 60,000,000 | 630,000 | 160,000 | 6.2 | 4.1 |

Referring particularly to Table I, column 1 indicates the individual test number, column 2, the rate of feed in pounds per hour at the conveyor 11. Column 3 indicates the temperature of the feed and column 4 the temperature of the product in the sterilizing unit. Column 5 indicates the temperature of the disc 53, while column 6 indicates whether for not steam was injected into the atmosphere of the sterilizer 46. Column 7 states the total count of vegetative bacteria in the feed in terms of colonies per gram. Column 8 indicates the total count of spore formers per gram in the feed. Column 9 refers to the total count of vegetable bacteria after sterilization in colonies per gram, it being remembered that for all tests total destruction of vegetative bacteria including salmonella, was accomplished. Column 10 indicates the percent of moisture in the feed and column 11 indicates the percent of moisture in the final sterilized product.

preventing the passage of air from hydration means to the conveyor means, a thermal disc processor coupled to said hydration means, means for passing a heat transfer medium to said thermal disc processor to heat the discs thereof, means for applying steam to the interior of said thermal disc processor to create a moist atmosphere therein, and means for discharging material from said thermal disc processor.

2. The system as defined in claim 1 together with means connected to said last named means for flash cooling said product.

3. The system as defined in claim 1 wherein said discs of said thermal disc processor include a series of mixing flights thereon, said mixing flights extending from the periphery of said discs toward the hub thereof and having a length equal to from 25 percent to 50 percent of the distance between said periphery of the disc and said hub.